United States Patent
Basoukeas et al.

(10) Patent No.: US 10,784,632 B2
(45) Date of Patent: Sep. 22, 2020

(54) ELECTRIC VEHICLE SERVICE DISCONNECT POSITION INDICATOR

(71) Applicant: Ford Global Technologies, LLC, Dearborn, MI (US)

(72) Inventors: Nondo G. Basoukeas, Northville, MI (US); Francisco Fernandez, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 15/812,073

(22) Filed: Nov. 14, 2017

(65) Prior Publication Data

US 2018/0076578 A1    Mar. 15, 2018

Related U.S. Application Data

(62) Division of application No. 14/156,879, filed on Jan. 16, 2014, now Pat. No. 9,847,610.

(51) Int. Cl.
| | |
|---|---|
| *B60K 6/20* | (2007.10) |
| *H01R 13/717* | (2006.01) |
| *B60L 3/04* | (2006.01) |
| *B60L 50/61* | (2019.01) |
| *B60L 50/16* | (2019.01) |
| *H01R 13/44* | (2006.01) |
| *H01R 13/627* | (2006.01) |

(52) U.S. Cl.
CPC .............. *H01R 13/717* (2013.01); *B60L 3/04* (2013.01); *B60L 50/16* (2019.02); *B60L 50/61* (2019.02); *H01R 13/44* (2013.01); *H01R 13/6272* (2013.01); *Y02T 10/6217* (2013.01); *Y02T 10/7005* (2013.01); *Y02T 10/7077* (2013.01); *Y10T 29/49004* (2015.01)

(58) Field of Classification Search
CPC ................ H01R 13/44; H01R 13/6271; H01R 13/6272; H01R 13/62; H01R 13/6295; H01R 13/62955; B60L 11/18; B60L 11/00; B60L 3/04; B60L 3/00; H01H 21/54; H01H 21/56; H01H 21/00
See application file for complete search history.

(56) References Cited

U.S. PATENT DOCUMENTS

| | | |
|---|---|---|
| 5,709,560 A | 1/1998 | Hio |
| 5,850,909 A | 12/1998 | Wagner |
| 6,261,123 B1 | 7/2001 | Kruger et al. |
| 6,319,050 B1 | 11/2001 | Miyazaki et al. |
| 6,551,118 B2 | 4/2003 | Langolf et al. |
| 6,616,370 B1 | 9/2003 | Signorelli |
| 6,746,275 B2 | 6/2004 | Yamakawa et al. |
| 6,824,406 B1 | 11/2004 | Sharples et al. |

(Continued)

FOREIGN PATENT DOCUMENTS

| | | |
|---|---|---|
| WO | 2012007343 | 1/2012 |
| WO | 2013182601 | 12/2013 |

*Primary Examiner* — James M Dolak
(74) *Attorney, Agent, or Firm* — David Kelley, Esq.; Carlson, Gaskey & Olds, P.C.

(57) ABSTRACT

An exemplary method of verifying that a service disconnect is seated includes indicating that the service disconnect is seated using a position indicator that selectively engages a handle of the service disconnect. The position indicator is separate and distinct from all portions of the service disconnect.

17 Claims, 6 Drawing Sheets

(56) References Cited

U.S. PATENT DOCUMENTS

| | | | |
|---|---|---|---|
| 6,957,979 B2 * | 10/2005 | Welsh | H05K 7/1409 439/545 |
| 7,070,438 B2 | 7/2006 | Dillon | |
| 7,084,361 B1 | 8/2006 | Bowes et al. | |
| 7,125,268 B1 | 10/2006 | Marukawa et al. | |
| 7,201,591 B2 * | 4/2007 | Fujii | H01R 13/62938 439/157 |
| 7,244,148 B2 | 7/2007 | Maguire et al. | |
| 7,267,564 B2 | 9/2007 | Bauman et al. | |
| 7,362,232 B2 | 4/2008 | Holle et al. | |
| 7,530,850 B2 | 5/2009 | Maguire et al. | |
| 7,559,778 B2 | 7/2009 | Pittenger et al. | |
| 7,695,297 B2 | 4/2010 | Pittenger et al. | |
| 7,872,206 B2 * | 1/2011 | Matsunaga | H01H 9/085 200/335 |
| 7,874,849 B2 | 1/2011 | Sticker et al. | |
| 7,893,809 B2 | 2/2011 | Head | |
| 8,481,878 B2 * | 7/2013 | Elliott | H01H 9/085 200/339 |
| 8,562,368 B2 | 10/2013 | Boyer | |
| 8,574,004 B1 | 11/2013 | Tarchinski et al. | |
| 8,702,442 B2 | 4/2014 | Debenedictis et al. | |
| 8,784,127 B2 | 7/2014 | Bashkin et al. | |
| 8,854,797 B2 | 10/2014 | Ikeda et al. | |
| 8,882,521 B2 * | 11/2014 | Conway | H01R 13/5213 439/157 |
| 9,004,935 B2 | 4/2015 | Lim | |
| 9,048,579 B2 * | 6/2015 | Itou | H01R 13/62944 |
| 9,071,017 B2 | 6/2015 | Shimizu et al. | |
| 9,085,240 B2 | 7/2015 | Rathmacher | |
| 9,088,100 B2 * | 7/2015 | Volantin | H01R 13/62938 |
| 9,160,127 B2 | 10/2015 | Rule-Greet et al. | |
| 9,251,985 B2 | 2/2016 | Garascia et al. | |
| 9,260,080 B2 | 2/2016 | Maguire et al. | |
| 9,293,289 B2 | 3/2016 | Chen et al. | |
| 9,365,118 B2 | 6/2016 | Deneszczuk et al. | |
| 9,368,913 B2 | 6/2016 | Saito et al. | |
| 9,391,400 B2 | 7/2016 | Henmi et al. | |
| 9,397,443 B2 | 7/2016 | Pade | |
| 9,425,554 B2 * | 8/2016 | Iwatani | H01R 13/6275 |
| 9,437,953 B2 | 9/2016 | Lappoehn | |
| 9,478,895 B2 | 10/2016 | Lappoehn | |
| 9,484,669 B2 | 11/2016 | Hiscoke | |
| 9,490,574 B2 | 11/2016 | Kon et al. | |
| 9,509,094 B2 | 11/2016 | Mathews et al. | |
| 9,543,706 B2 | 1/2017 | Zhang | |
| 9,564,701 B2 | 2/2017 | Hotea et al. | |
| 9,564,704 B2 | 2/2017 | Droesbeke et al. | |
| 9,568,681 B2 | 2/2017 | Roussel et al. | |
| 9,577,371 B2 | 2/2017 | Nishimura et al. | |
| 9,586,489 B2 | 3/2017 | Klein et al. | |
| 9,595,784 B2 | 3/2017 | Kataoka | |
| 9,595,787 B2 | 3/2017 | Qiao et al. | |
| 9,608,365 B2 | 3/2017 | Kroeckel | |
| 9,608,373 B2 | 3/2017 | Wu et al. | |
| 9,847,610 B2 * | 12/2017 | Basoukeas | H01R 13/44 |
| 10,250,047 B2 * | 4/2019 | Kang | B60L 50/51 |
| 10,263,367 B2 * | 4/2019 | Nicolas | H01R 13/6271 |
| 10,283,909 B2 * | 5/2019 | Holub | H01R 13/641 |
| 10,290,973 B1 * | 5/2019 | Gisoldi | H01R 13/62944 |
| 10,297,945 B2 * | 5/2019 | Yamane | H01R 13/6295 |
| 10,374,356 B2 * | 8/2019 | Amerio | H01R 13/62955 |
| 10,404,012 B1 * | 9/2019 | Stoyanov | H01R 13/6272 |
| 10,411,405 B2 * | 9/2019 | Obata | H01R 13/5025 |
| 10,630,025 B2 * | 4/2020 | Ikeya | H01R 13/62994 |
| 2004/0043654 A1 | 3/2004 | Lee et al. | |
| 2013/0043971 A1 | 2/2013 | Chen et al. | |
| 2005/0984819 | 11/2015 | Matsui et al. | |

\* cited by examiner

ELECTRIC VEHICLE SERVICE DISCONNECT POSITION INDICATOR

CROSS-REFERENCE TO RELATED APPLICATIONS

This application is a divisional of U.S. patent application Ser. No. 14/156,879, which was filed on 16 Jan. 2014 and is incorporated herein by reference.

BACKGROUND

This disclosure relates generally to a service disconnect and, more particularly, to an indicator for verifying a position of the service disconnect.

Generally, electric vehicles differ from conventional motor vehicles because electric vehicles are selectively driven using one or more battery-powered electric machines. Conventional motor vehicles, by contrast, rely exclusively on an internal combustion engine to drive the vehicle. Electric vehicles may use electric machines instead of, or in addition to, the internal combustion engine.

Example electric vehicles include hybrid electric vehicles (HEVs), plug-in hybrid electric vehicles (PHEVs), fuel cell vehicles, and battery electric vehicles (BEVs). A powertrain of an electric vehicle is typically equipped with a battery that stores electrical power for powering the electric machine. The battery may be charged prior to use. The battery may be recharged during a drive by regeneration braking or an internal combustion engine.

Electric vehicles include service disconnects. During normal operation, the service disconnect is seated closed. Opening the service disconnect may be necessary when, for example, performing maintenance on the electric vehicle. Verifying that the service disconnect is seated and closed can be difficult. In some examples, the service disconnect may be appear closed, but not be seated. In such examples, road vibration for example, can undesirably cause the service disconnect to open.

SUMMARY

A method of verifying that a service disconnect is seated according to an exemplary aspect of the present disclosure includes, among other things, indicating that the service disconnect is seated using a position indicator that selectively engages a handle of the service disconnect. The position indicator is separate and distinct from all portions of the service disconnect.

Another example of the foregoing method includes blocking the position indicator from engaging the service disconnect unless the service disconnect is in a seated position.

Another example of the foregoing method includes pivoting and then sliding the handle of the service disconnect relative to a base of the service disconnect to transition the service disconnect from an unseated position to a seated position.

In another example of the foregoing method, the handle moves along an axis when sliding relative to the base to transition the service disconnect from the unseated position to the seated position.

Another example of the foregoing method includes a first and a second clip positioned adjacent opposing axial ends of the handle. The first and second clips engage the handle such that the entire handle is axially disposed between the first and the second clips when the position indicator is in an engaged position with the service disconnect.

In another example of the foregoing method, the position indicator is moveable from a disengaged to an engaged position when the service disconnect in the seated position, and is not moveable to the engaged position when the service disconnect is in the unseated position. A first clip and a second clip of the position indicator engage a perimeter of the handle to hold the position indicator in the engaged position.

In another example of the foregoing method, the first clip of the position indicator engages a surface of the service disconnect facing away from a base of the position indicator when the service disconnect is in the seated position.

A service disconnect seating verification method according to another exemplary aspect of the present disclosure includes, among other things, transitioning a service disconnect from an unseated to a seated position by pivoting and then sliding a handle of a service disconnect relative to a base of the service disconnect, and securing a position indicator to opposing axial ends of the handle when the service disconnect is in the seated position. The securing is blocked when the service disconnect is in the unseated position.

In another example of the foregoing method, the position indicator is separate and distinct from all portions of the service disconnect.

In another example of the foregoing method, the securing comprises clipping a first clip and a second clip to a perimeter of the handle.

In another example of the foregoing method, the sliding is along an axis, and the securing comprises clipping a first clip to an first axial end of the handle, and a second clip to an opposite second axial end of the handle.

In another example of the foregoing method, the first clip extends from a position indicator base. The first clip contacts a first surface of the service disconnect facing away from the position indicator base when the service disconnect is in the seated position and the position indicator is in the engaged position with the service disconnect. The first clip is prevented from contacting the first surface by a second surface of the service disconnect facing toward the position indicator base when the service disconnect is in the unseated position.

In another example of the foregoing method, the first surface is a surface of the handle of the service disconnect.

In another example of the foregoing method, the first clip rotates about the second clip during the clipping.

In another example of the foregoing method, the entire handle is axially disposed between the first clip and the second clip when the position indicator is in the engaged position.

In another example of the foregoing method, the service disconnect is opened to electrically disconnect portions of an electric vehicle powertrain and closed to electrically connect the portions of the electric vehicle powertrain.

In another example of the foregoing method, a plurality of high voltage contactors of an electric vehicle powertrain are connected when the service disconnect is closed, and the plurality of high voltage contactors of the electric vehicle powertrain are disconnected when the service disconnect is open.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
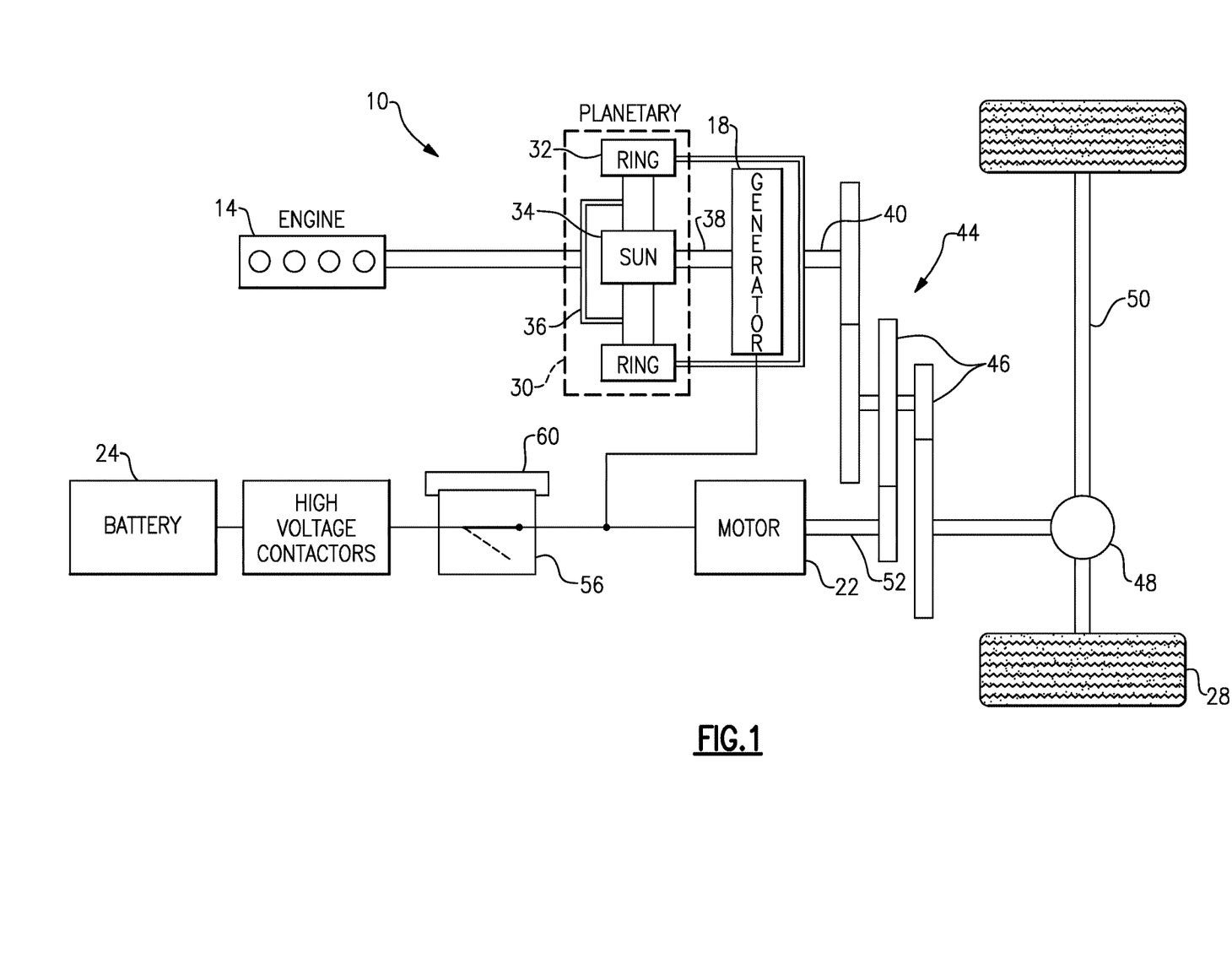
FIG. 1 illustrates a schematic view of a powertrain of an example electric vehicle.
Figure 2:
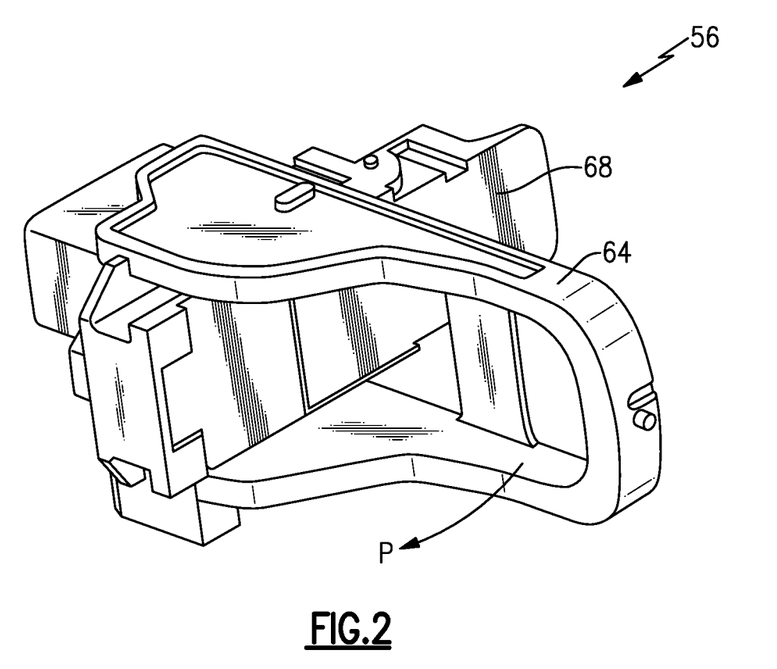
FIG. 2 illustrates a perspective view of a service disconnect of the powertrain of FIG. 1 in an unseated position.
Figure 3:
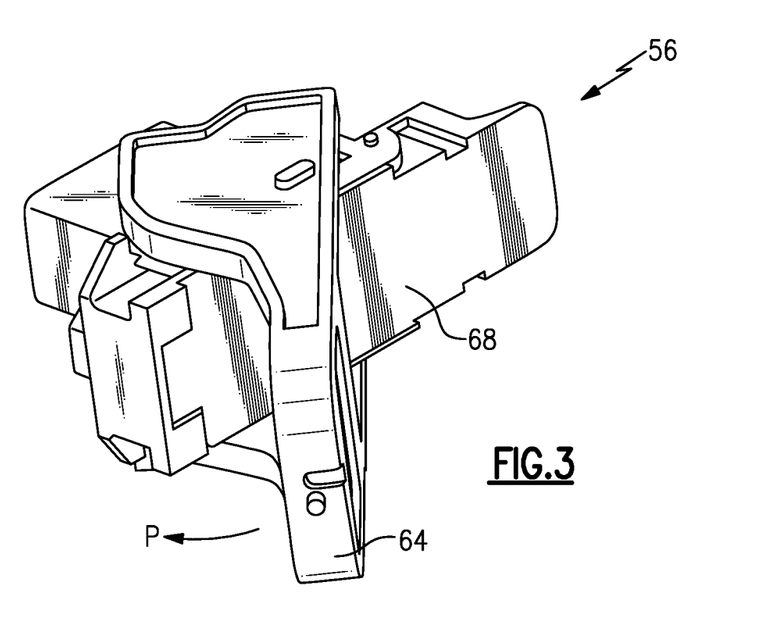
FIG. 3 illustrates a perspective view of the service disconnect of FIG. 2 moved closer to a seated position.

FIG. 1 schematically illustrates a powertrain 10 for an electric vehicle. Although depicted as a hybrid electric vehicle (HEV), it should be understood that the concepts described herein are not limited to HEVs and could extend to other electrified vehicles, including, but not limited to, plug-in hybrid electric vehicles (PHEVs) and battery electric vehicles (BEVs).

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery 24. In this example, the second drive system is considered an electric drive system of the powertrain 10. The first and second drive systems generate torque to drive one or more sets of vehicle drive wheels 28 of the electric vehicle.

The engine 14, which is an internal combustion engine in this example, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery 24.

The battery 24 is an example type of electric vehicle battery assembly. The battery 24 may have the form of a high voltage battery that is capable of outputting electrical power to operate the motor 22 and the generator 18. Other types of energy storage devices and/or output devices can also be used with the electric vehicle having the powertrain 10.

A service disconnect 56 is used to selectively disconnect the battery 24 from other portions of the powertrain 10. The service disconnect 56 may be located in various positions within the vehicle, including areas near the battery 24. In other examples, the service disconnect 56 may be used to electrically disconnect other areas of the powertrain 10.

The service disconnect 56 can be closed or open. When closed, the battery 24 is electrically connected to the remaining portions of the powertrain 10. When open, the battery 24 is electrically disconnected from the remaining portions of the powertrain 10. When the service disconnect 56 is closed, a high voltage interlock loop and high voltage contactors of the powertrain 10 are closed. When the service disconnect 56 is open, the high voltage interlock loop and the high voltage contactors are open. In some examples, the service disconnect 56 transitioning from closed to open triggers an alert, such as an on-board diagnostic code that is displayed within the vehicle.

Generally, the service disconnect 56 is seated within the powertrain 10 when closed. Unseating the service disconnect 56 then causes the service disconnect 56 to open.

When the powertrain 10 is assembled, the service disconnect 56 should be seated within the powertrain 10 on the assembly line. Seating the service disconnect 56 ensures the service disconnect 56 remains closed, during operation of the powertrain 10. Seating the service disconnect 56 prevents the service disconnect 56 from undesirably moving from closed to open.

When servicing the powertrain 10 is required, a technician may unseat the service disconnect 56 and move the service disconnect from closed to open.

In some examples, seating the service disconnect 56 is not required for the service disconnect 56 to close. However, if the service disconnect 56 is unseated, the service disconnect 56 may undesirably slide or otherwise move from closed to open when such movement is not desired, such as when the vehicle is moving. That is, when the service disconnect 56 is seated, the service disconnect 56 does not move from the closed to open when such movement is not desired. When the service disconnect 56 is unseated, the service disconnect 56 may move from the closed to open when such movement is not desired.

Seating the service disconnect 56 during assembly is typically desirable, but verifying that the service disconnect 56 is seated is difficult. The example powertrain 10 includes a position indicator 60 used to verify that the service disconnect 56 is seated.

Figure 4:
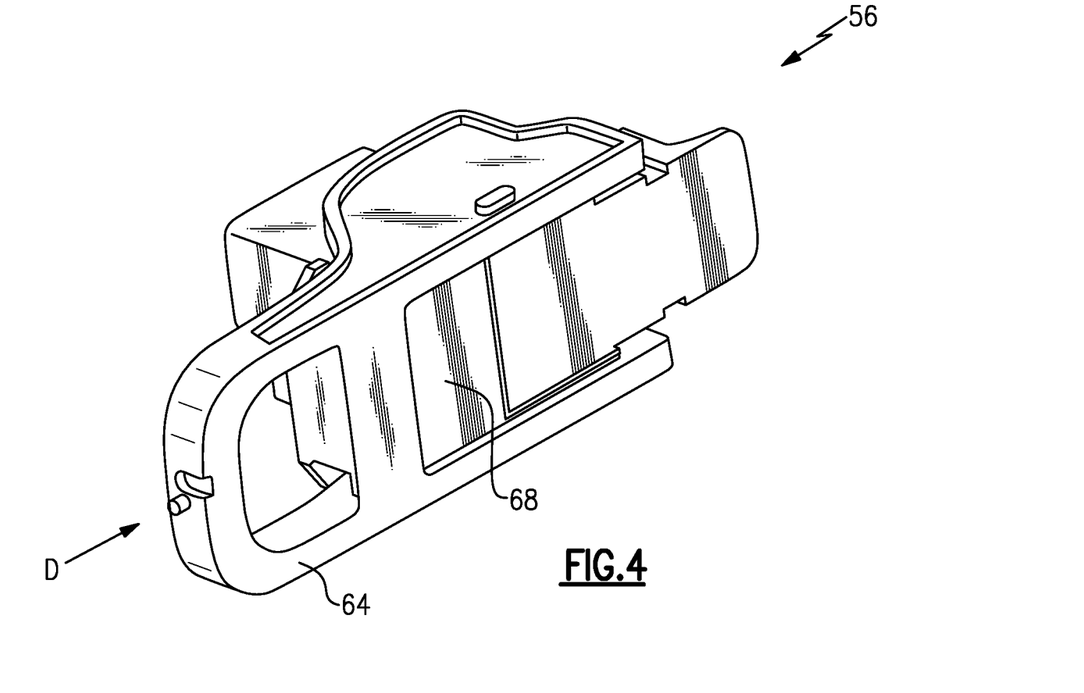
FIG. 4 illustrates the service disconnect of FIG. 3 moved closer to the seated position than the service disconnect of FIG. 3.
Figure 5:
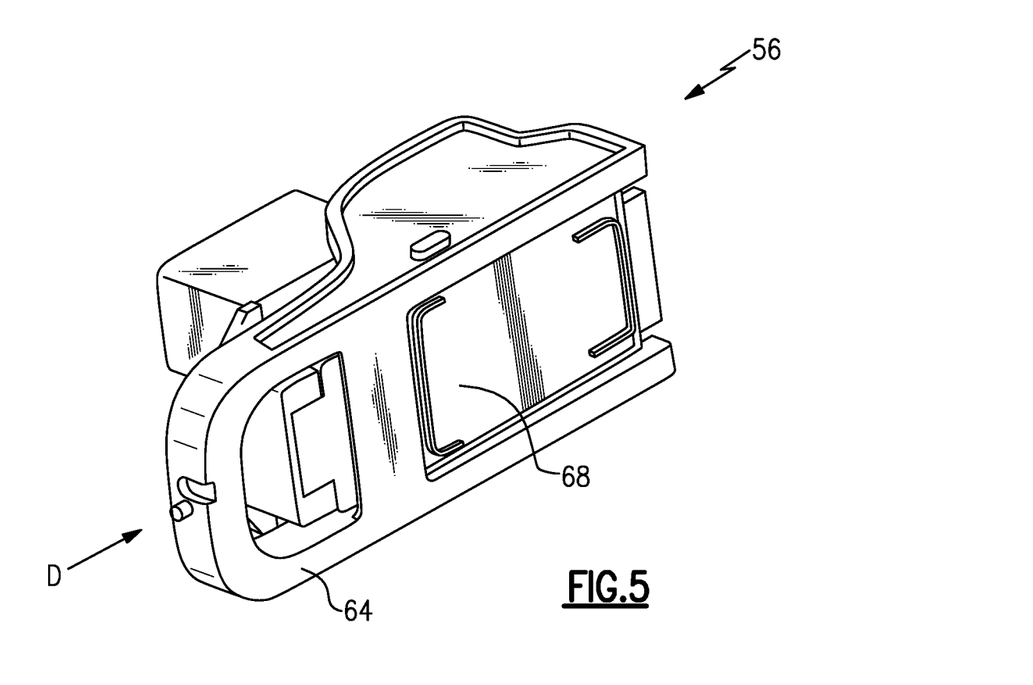
FIG. 5 illustrates the service disconnect of FIG. 2 in the seated position.

Referring now to FIGS. 2-5, the example service disconnect 56 includes a handle 64, or cam lever, that is pivotably attached to a base 68 to move the service disconnect 56 from unseated and open (FIG. 2) to seated and closed (FIG. 5). Starting with position of FIG. 2, moving the service disconnect 56 to a seated and closed position includes pivoting the handle 64 in a direction P relative to the base 68 until the handle 64 is in the position of FIG. 4. Next, the handle 64 slides in a direction D from the position shown in FIG. 4 to the seated position of FIG. 5.

Although the service disconnect 56 may be closed when the service disconnect 56 is in the position of, for example, FIG. 4, the service disconnect 56 is not closed and seated until the service disconnect 56 is in the position of FIG. 5.

In the position of FIG. 4, the service disconnect 56 may undesirably move from closed to open. Seating the service disconnect 56, as shown in FIG. 5, prevents undesirably movement from closed to open.

Figure 6:
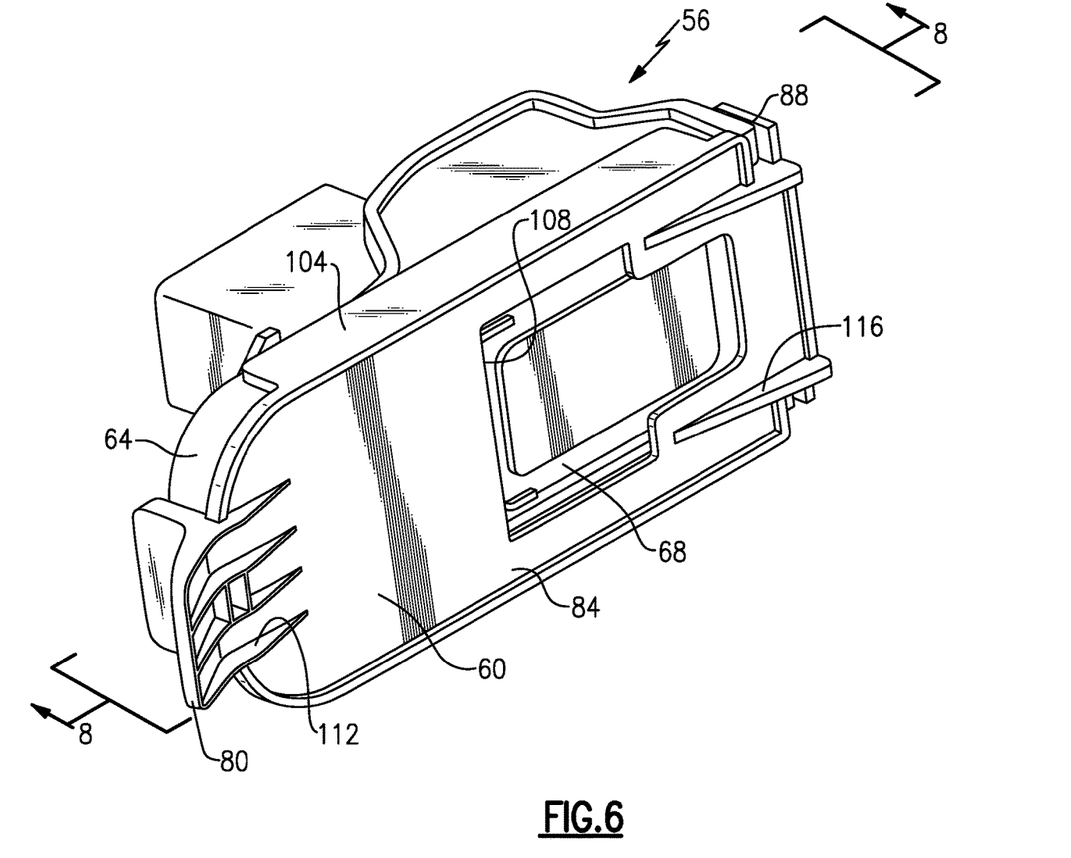
FIG. 6 illustrates a perspective view of a position indicator engaging the service disconnect in the position of FIG. 5.

Referring now to FIG. 6, a position indicator 60 is configured to engage with the service disconnect 56 when the service disconnect 56 is seated as shown in FIG. 5. When the service disconnect 56 is not in seated, the example position indicator 60 cannot be properly secured onto, or engaged with, the service disconnect 56. The example position indicator 60 grabs a perimeter of the handle 64 when secured onto the service disconnect 56.

Observing the position indicator 60 secured to the service disconnect 56 confirms that the service disconnect 56 is seated rather than, for example, in the position of FIG. 4. The position indicator 60 and the service disconnect 56 may be made of contrasting colors to facilitate identifying the position indicator 60 is secured to the service disconnect. The position indicator 60 and the service disconnect 56 together provide a service disconnect assembly.

Figure 7:
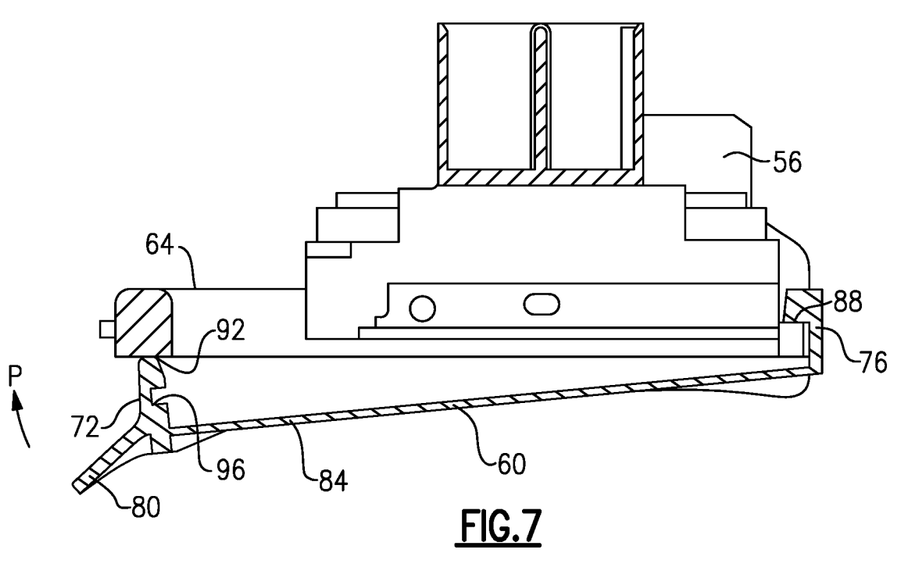
FIG. 7 shows the position indicator used with the service disconnect in the position of FIG. 4.
Figure 8:
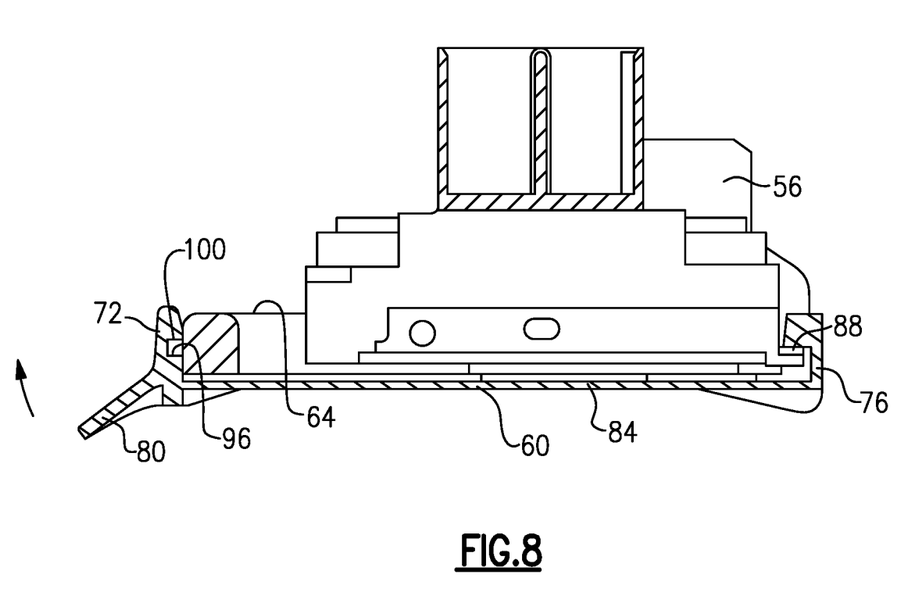
FIG. 8 shows a section view at line 8-8 in FIG. 6.

Referring now to FIGS. 7 and 8, the position indicator 60 includes a first clip 72, a second clip 76, and an installation tab 80 extending from a base 84. To install the position indicator 60, the second clip 76 is positioned under a lip 88 of the service disconnect 56. The position indicator 60 is then rotated in the direction P such that the first clip 72 is rotated about the second clip 76 and toward a position engaged with the handle 64. The tab 80 extends from the base opposite the first clip 72. During installation, a user may grasp the tab 80 to rotate the position indicator 60.

If the service disconnect 56 is not in the seated position of FIGS. 5 and 6, the first clip 72 will contact a surface 92 of the handle 64 as shown in FIG. 7. If the service disconnect 56 is in the seated position of FIGS. 5 and 6, a groove 96 of the first clip 72 will receive a pin 100 extending from the hinged handle 64. In some examples, the position indicator 60 comprises a polyvinyltoluene material to facilitate some flexing of the first clip 72 during assembly.

For the pin 100 to be received within the groove 96 and the second clip 76 to be received behind the lip 88, the example position indicator 60 must be seated. The position indicator 60, as can be appreciated, is thus only installable when the service disconnect 56 is in the seated position. If the service disconnect 56 is not in the seated position, the position indicator 60 cannot be secured, and may fall off the service disconnect 56. The position indicator 60 that is not secured to the service disconnect 56 provides a visual indication that the service disconnect 56 is not seated.

A surface of the pin 100 facing away from the base 84 contacts the first clip 72 when the position indicator 60 is engaged to the service disconnect 56. Contact between the first clip 72 and the surface 92, which faces the base 84, prevents the position indicator 60 from engaging the service disconnect 56 that is unseated (i.e., not seated).

The example position indicator 60 includes alignment ribs 104 for engaging opposing sides of the service disconnect 56. The position indicator 60 may include a window 108 to reveal information about the service disconnect 56, such as text information stamped into the service disconnect 56. Support ribs 112 extend from the base 84 of the service disconnect 56 to the tab 80. Support ribs 116 also extend from the base 84 to the second clip 76.

Figure 9:
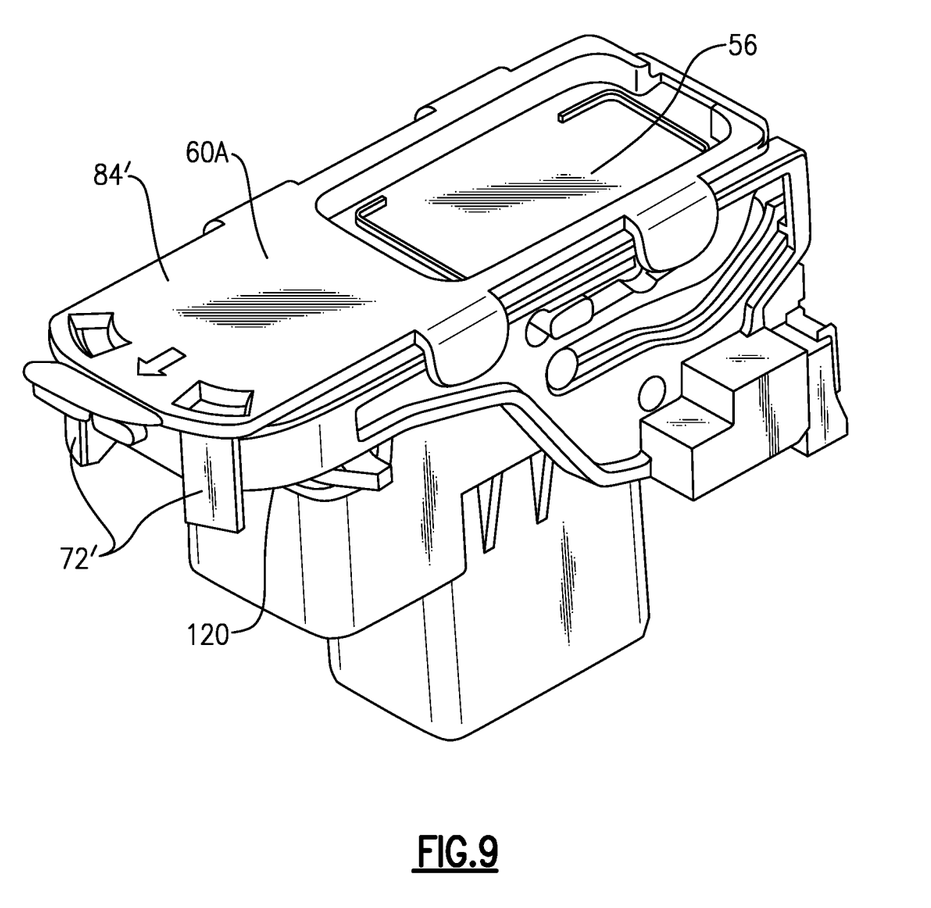
FIG. 9 shows another example position indicator used with the service disconnect in the position of FIG. 4.

Referring now to FIG. 9, another example position indicator 60A may include two first clips 72' spaced from each other. The two first clips 72' engage a surface 120 of the service disconnect opposite a base 84' of the position indicator 60'. The position indicator 60A can engage the service disconnect 56 only when the service disconnect 56 is seated.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A method of verifying that a service disconnect is seated, comprising:
pivoting and then sliding a handle of the service disconnect relative to a base of the service disconnect to transition the service disconnect from an unseated position to a seated position, the pivoting of the handle occurring without sliding the handle, the sliding of the handle occurring without pivoting the handle; and
indicating that the service disconnect is in the seated position using a position indicator that selectively engages the handle of the service disconnect, the position indicator separate and distinct from all portions of the service disconnect.

2. The method of claim 1, further comprising blocking the position indicator from engaging the service disconnect unless the service disconnect is in the seated position.

3. The method of claim 1, wherein the handle moves along an axis when sliding relative to the base to transition the service disconnect from the unseated position to the seated position.

4. The method of claim 3, wherein a first clip and a second clip are positioned adjacent opposing axial ends of the handle, the first clip and the second clip engaging the handle such that the entire handle is axially disposed between the first and the second clips when the position indicator is in an engaged position with the service disconnect.

5. The method of claim 1, wherein the position indicator is moveable from a disengaged position to an engaged position when the service disconnect in the seated position, and is not moveable to the engaged position when the service disconnect is in the unseated position, wherein a first clip and a second clip of the position indicator engage a perimeter of the handle to hold the position indicator in the engaged position.

6. The method of claim 5, wherein the second clip of the position indicator engages a surface of the service disconnect facing away from a base of the position indicator when the service disconnect is in the seated position.

7. A service disconnect seating verification method, comprising:
transitioning a service disconnect from an unseated to a seated position by pivoting a handle of the service disconnect relative to a base of the service disconnect and then, after completing the pivoting, sliding the handle of the service disconnect relative to the base of the service disconnect without further pivoting of the handle; and securing a position indicator to opposing axial ends of the handle when the service disconnect is in the seated position, wherein the securing of the position indicator to opposing axial ends of the handle is blocked when the service disconnect is in the unseated position.

8. The method of claim 7, wherein the position indicator is separate and distinct from all portions of the service disconnect.

9. The method of claim 7, wherein the securing comprises clipping a first clip and a second clip to a perimeter of the handle.

10. The method of claim 7, wherein the position indicator is separate and distinct from all portions of the service disconnect, wherein the sliding is along an axis, and securing comprises clipping a first clip to a first axial end of the handle, and a second clip to an opposite second axial end of the handle.

11. The method of claim 10, wherein the first clip extends from a position indicator base, the first clip contacting a first surface of the service disconnect facing away from the position indicator base when the service disconnect is in the seated position and the position indicator is in the engaged position with the service disconnect, the first clip prevented from contacting the first surface by a second surface of the service disconnect facing toward the position indicator base when the service disconnect is in the unseated position.

12. The method of claim 11, wherein the first surface is a surface of the handle of the service disconnect.

13. The method of claim 10, wherein the first clip rotates about the second clip during the clipping.

14. The method of claim 10, wherein the entire handle is axially disposed between the first clip and the second clip when the position indicator is in the engaged position.

15. The method of claim 10, wherein the service disconnect is opened to electrically disconnect portions of an electric vehicle powertrain and closed to electrically connect the portions of the electric vehicle powertrain.

16. The method of claim 10, wherein a plurality of high voltage contactors of an electric vehicle powertrain are connected when the service disconnect is closed, and the plurality of high voltage contactors of the electric vehicle powertrain are disconnected when the service disconnect is open.

17. The method of claim 5, wherein the handle moves along an axis when sliding relative to the base to transition the service disconnect from the unseated position to the seated position, wherein the first clip and the second clip are positioned adjacent opposing axial ends of the handle, the first clip and the second clip engaging the handle such that the entire handle is axially disposed between the first and the second clips when the position indicator is in an engaged position with the service disconnect.

* * * * *